3,108,010
METHOD OF TREATING RUBBER-REINFORCING FIBROUS MATERIAL FOR IMPROVING HEAT RESISTANCE THEREOF

Takashi Nakane, Tokyo, and Takeo Kubota and Yoshiro Umezawa, Fujisawa-shi, Japan, assignors to The Yokohama Rubber Company, Limited, Tokyo, Japan, a corporation of Japan
No Drawing. Filed July 18, 1961, Ser. No. 124,811
Claims priority, application Japan July 25, 1960
14 Claims. (Cl. 117—47)

The present invention relates to a method of treating rubber-reinforcing fibrous material for improving the properties thereof and particularly for improving the reinforcing characteristic of the material so as to reduce loss in strength thereof under exothermic conditions while at the same time improving the strength of the adhesive bond formed between the fibrous material and the rubber being reinforced thereby.

In most cases, fibrous material for rubber reinforcement is required to have substantial resistance to heat, water and fatigue load. This is particularly true with major rubber products such as automotive tires and conveyor belts, and such characteristic properties are essential not only with the fibrous material per se but with the adhesive bond formed between the fibrous material and the rubber being reinforced thereby.

The present invention has for its object to provide a method of treating fibrous rubber-reinforcing material for the purpose of improving such characteristic properties thereof.

According to the present invention, there is provided a method of treating rubber-reinforcing fibrous material for imparting thereto substantial resistance to heat, water and fatigue as well as substantial flexibility, while enabling the fibrous material to form a water-proof and heat-resistant adhesive bond with rubber material to be reinforced thereby.

In the method of treating fibrous rubber-reinforcing material according to the present invention, organic tin compounds are employed preferably in the form of a dialkyl tin compound or a tri-organo-tin sulfide for successful results.

In order to apply such an organic tin compound to the fibrous material, it is contemplated according to the present invention, that the organic tin compound or a mixture of vegetable oils mainly consisting of fatty acid glycerides with the organic tin compound be diluted with water or an organic solvent to form a treating mixture containing the organic tin compound in a concentration not exceeding 10% by weight of the mixture. When diluted with water, the mixture is emulsified by use of a suitable emulsifying agent such as an alkyl ether of polyethylene oxide or an alkyl ester thereof to form a water emulsion having a concentation not exceeding 10% and preferably about 5%. In either case, the treating composition is prepared so that the proportion of the solids pick-up on the treated fibrous material to the weight of the fibrous material be 5% or less.

The organic tin compound to be used in the treatment according to the present invention preferably takes the form of (1) a dialkyl tin compound selected typically for a group of dibutyl tin derivatives such as dibutyl tin distearate $(C_4H_9)_2Sn \cdot (O_2C_{18}H_{35})_2$, dibutyl tin dilaurate $(C_3H_9)_2Sn \cdot (O_2C_{12}H_{23})_2$, dibutyl tin dimalate $$(C_4H_9)_2Sn \cdot (O_2CH=CHCO_2R)_2$$

and dibutyl tin polysulfide, or (2) a tri-organo tin sulfide having the general formula $$(R)_3Sn-S-Sn(R)_3$$

which is produced by the reaction of a tri-organo tin compound with a sulfur compound such as hydrogen sulfide or metal sulfide. In the above formula, R represents an alkyl group $-C_nH_{2n+1}$ such as $-CH_3$, $-C_2H_5$, $-C_4H_9$, $-C_9H_{19}$ or $-C_{11}H_{23}$ and $n$ is a positive integer.

The liquid composition for the reinforcing treatment of fibrous material according to the present invention, which contains any of such organic tin compounds, may take two forms. One is a diluted solution of the organic tin compound in water or an organic solvent which is effective to impart to the fibrous material itself resistance to heat and other ageing effects; and the other is a diluted solution in water or an organic solvent of a composition of the organic tin compound and a vegetable oil, which solution is not only effective to impart to the fibrous material resistance to heat and water and flexibility, but also effective to promote the adhesive strength of the fibrous material the rubber reinforced thereby.

The vegetable oil use in the latter solution is preferably a drying oil or a semidrying oil, and the proportion of the organic tin compound to the vegetable oil is preferably selected at 50% or less.

The diluted liquid composition of organic tin compound described above may either be a solution in organic solvent of a concentration of 10% or less, or preferably 5% and less, or it may be a water emulsion of similar concentration.

To prepare such a water emulsion, a suitable emulsifying agent such as alkyl ether or alkyl ester of polyethylene oxide is used.

In the immersion treatment of fibrous material by use of such a dilute composition of organic tin compound, the solids pick-up of organic tin compound on the fibrous material during the treatment should be held to 5% or less by weight of the fibrous material. For this purpose, the concentration of the treating composition is selected at 10% and less, or preferably 5% or less.

The application of such composition to fibrous material may be effected in various ways. Firstly, it may be effected at the spinning stage or, after spinning upon yarns, cords or fabrics. Secondly, the treatment of fibrous material according to the invention may be effected during adhesive treatment by adding the treating composition to a suitable adhesive composition including for example resorcin formalin latex in which the cords or fabrics are to be immersed. Alternatively, it may be effected immediately after or before such adhesive treatment.

After the immersion treatment, the fibrous material is dried at about 50° to 160° C. In case such immersion is effected immediately before adhesive treatment, the adhesive treatment should be carried out after the water content of the fibrous material has been reduced to 15% or less.

It has been found that the fibrous material treated according to the present invention substantially maintains its strength even at high temperatures. Particularly when such treated fibrous material is embedded as a reinforcement for tires, belts and other like rubber products, any reduction in strength of the reinforcement is effectively prevented even under exothermic conditions. Further, when subjected to bending action, the reinforcement shows about 30% to 50% higher tensile strength as compared with a reinforcement which is not subjected to the above treatment.

It has also been found that the treatment according to the present invention imparts to industrial fibrous material used as a rubber reinforcement substantial resistance to heat, water and fatigue, making it possible to provide rubber products having improved strength and long service life.

Some practical examples of the inventive treatment will now be described.

*Example 1*

The treatment of the present invention was applied to high-tenacity or super rayon filaments of 1650 D as they were spun. In spinning ordinary super rayon filaments of 1650 D, "oiling" is usually effected. In the oiling step, a portion or all of the usual tire cord oil may be replaced by the diluted composition of organic tin compound according to the present invention to obtain the advantageous results. In this example, two-thirds of the oil was replaced by the treating composition according to the present invention.

The organic tin compound used was dibutyl tin dilaurate, the composed diluted liquid composition being as follows:

| | | Parts |
|---|---|---|
| #1. | Soy bean oil | 5.00 |
| | Dibutyl tin dilaurate | 2.50 |
| | Noigen ET-140[1] | 0.38 |
| | Water | 22.12 |
| #2. | Water | 70.00 |
| | | 100.00 |

[1] Polyethylene oleyl ether.

First, an oil emulsion (#1) containing 16.7% of soy bean oil and 8.3% of dibutyl tin dilaurate was prepared.

To this end, soy bean oil, dibutyl tin dilaurate and Noigen ET-140 were mixed and heated to about 50° to 60° C. to obtain a homogeneous mixture. While vigorously stirring the mixture, 22.12 parts of water heated to about 50° to 60° C. were gradually added thereto to obtain an emulsion. This was passed through a homogenizer to be completely emulsified. For practical application, 70 parts of water (#2) was added to this mother liquor and completely mixed therewith.

The diluted organic tin solution thus prepared was used in oiling at the spinning stage of high-tenacity rayon. Thus, part or all of the conventional oiling composition was replaced by the above treating solution of the present invention.

In this example, oiling was effected during spinning with a water emulsion containing two parts of the treating agent of the present invention and one part of the ordinary oiling composition.

After such oiling, the yarns were dried and wound in the conventional manner. The yarns thus treated exhibited highly improved resistance to heat and water, and when used for industrial material such as tire cords or belt duck, the fibers exhibited improved strength particularly under heated condition and formed improved heat- and water-resistant adhesive bonds with rubber. Such rubber products also exhibited highly extended service lives in practical testing.

The following is the result of comparison tests conducted between ordinary tire cords of 1650 D/2 (upper end lower twists, 12 turns per inch) and those which were subjected to the treatment, according to the invention.

| | Prior method, kg. | Present method, kg. |
|---|---|---|
| Raw cord strength (bone dry) | 37.7 | 14.1 |
| Cord strength (bone dry): | | |
| After RFL treatment | 13.9 | 14.5 |
| After heating at 165° C. for 5 hrs | 10.3 | 13.2 |
| After heating at 165° C. for 10 hrs | 9.4 | 11.2 |
| Adhesive strength of RFL treated cords (H-test): | | |
| After heating at 130° C. for 1 hr | 11.0 | 11.7 |
| After heating at 160° C. for 1 hr | 6.8 | 7.6 |
| After water dip for 24 hrs | 4.4 | 5.5 |

RFL stands for resorcin-formalin-latex.

As apparent from the above data, the tire cords treated according to the present invention exhibited excellent strength under heated conditions. The adhesive strength of the cords subjected to dipping in resorcin-formalin-latex were also highly improved with respect to rubber material, particularly under heated and moistened conditions.

Then, tires were fabricated employing the cords treated in accordance with this example. The test result of such tire is as follows.

Tire size: 8.25–20–14 PR (12P)
Indoor running test:
   Test conditions—
      Speed: 40 miles/hr.
      Air pressure: TRA st'd.
      Load: 140% of TRA st'd, 10% up for each additional 250 miles.
   Test results—Burst after 3900 km. run. Conventional tires as a reference showed a running life of 2700 km.

Thus the running life of tires was extended about 40% by the treatment according to the invention. In the indoor running test on the tire which was constructed using cords treated according to this invention, the growth of outer circumference and width and heat generation in the tire were much less than those of the ordinary tire. These facts show that the heat and fatigue resistances of the fibrous rubber-reinforcing material were substantially improved by the treatment of the present invention thereby remarkably improving the tire qualities including tire service life.

*Example 2*

In this example, tire cords were treated with triorgano tin sulfide.

Employing bistrilauryl tin sulfide as an organic tin compound, a dilute solution in organic solvent, i.e., a 3% solution in a mixed solvent of $CCl_4$ and $CH_3OH$ in ratio of 3 to 1 was prepared.

Firstly, high-tenacity rayon tire cords of 1650 D/2 were immersed in the treating solution thus prepared, and dried after removing the solvent. The proportion of tin compound deposited on the fibrous material was 0.9%.

The cords thus treated exhibited good heat resistance. Thus, after heating for two hours at 180° C., the drop in tensile-strength was very little, i.e., 98% of the initial strength was retained. This represents a substantial improvement in heat resistance in view of the fact that conventional tire cords, not subjected to the inventive treatment, retained only 92% of the initial strength thereof after heating for two hours at 180° C.

Evaluation of the properties of raw cord is not always sufficient to estimate the tire cord performance, because tire cords are subjected to adhesive treatment before they are built in tires. Important are the properties of the cords subjected to such adhesive treatment.

Accordingly, the inventors carried out the conventional RFL adhesive treatment upon the tire cords treated as described above in this example to determine the performances of the tire cords finally obtained. The results were as follows:

|  | Prior method | Present method |
|---|---|---|
| Strength (tensile), kg.: |  |  |
| Bone dry | 13.91 | 14.48 |
| After heating 165° C. for 5 hrs | 9.29 | 11.28 |
| After heating 165° C. for 10 hrs | 7.93 | 9.63 |
| After 1,000-mile running test | 12.30 | 13.81 |

From the above data, it will be clearly seen that the treatment with the organic tin compound in accordance with the present invention remarkably increases the heat resistance of the cords.

*Example 3*

In this example the present invention was applied to tire cords immediately before adhesive treatment thereof.

Specifically, tire cords were preliminarily immersed in a dilute solution of vegetable oil containing an organic tin compound according to the present invention. The cords were then dried and immediately subjected to so-called tire cord dipping (resorcin-formalin-latex treatment).

The organic tin compound used in this example was di-n-octyl tin bis-monobutyl maleate, and a treating solution of the following composition was prepared.

| #1. | Cotton seed oil | 5.0 |
|---|---|---|
|  | The above tin compound | 2.5 |
|  | Noigen ET–140[1] | 0.3 |
|  | Water | 22.2 |
| #2. | Water | 70.00 |

[1] Polyethylene glycol oleyl ether.

The compounding was effected by the same procedure as given in detail in Example 1, and a treating liquid composition in the form of a 7.5% aqueous emulsion containing 2.5% of organic tin compound and 5.0% of vegetable oil was prepared preliminarily.

The treating composition was employed in immersion treatment of 1650 D/2 tire cords in fabric form with light tension applied thereto. After the immersion, any excess liquid deposited on the cords was removed with a squeeze roll. Then, the cords were dried to a water content of less than 15%, and preferably less than 5%. In this example, the water content was 4.1%.

The cords were then subjected to "dipping" in the resorcin-formalin-latex solution in the usual way.

The cords treated as described above in this example exhibited remarkably improved resistance to water, heat and fatigue. The tires containing such cords showed a running life extended more than 30%. The data are as follows:

|  | Prior method, kg. | Present method, kg. |
|---|---|---|
| Raw cord strength (bone dry) | 13.7 | 14.3 |
| Cord strength (bone dry): |  |  |
| After RFL treatment | 14.2 | 15.0 |
| After heating at 165° C. for 5 hrs | 11.1 | 13.4 |
| After heating at 165° C. for 10 hrs | 9.5 | 11.6 |
| Adhesive strength of RFL treated cords (H-test): |  |  |
| After heating at 130° C. for 1 hr | 11.2 | 11.5 |
| After heating at 160° C. for 1 hr | 7.3 | 8.1 |
| After immersion in water for 24 hrs | 4.4 | 5.2 |

As clearly seen from the above test data in this example, the strength of tire cords at elevated temperatures were excellent and highly improved adhesive characteristics were obtained particularly under heated as well as moistened conditions.

Further, the cords treated in this example were used for the making of tires, which showed excellent performance as follows:

Tires of type 825–20–14 PR (12P) were fabricated and subjected to an indoor running test under the following conditions: Speed, 40 miles/hr.; air pressure, TRA st'd; load, 140% of TRA st'd and 10% up for each additional 250 miles.

The running life obtained in the test was 3,400/km. as contrasted to 2500 km. obtained with the conventional tire as a reference, which represents a life prolongation of more than 30%.

During the indoor running test no substantial growth in outer circumference and width nor heat generation was observed with the tire according to the present invention.

These facts demonstrate the advantages of the present invention, indicating marked improvements in tire performance and service life made possible by use of improved tire cords according to the present invention.

A few typical examples of reinforcing treatment according to the invention have been given herein in connection with rayon tire cords to show improvements in heat resistance of the reinforcing cords per se, and in resistances to water, heat and fatigue of the adhesive bond formed between the cords and the rubber, as well as in life and performance of the rubber products or tires reinforced by such cords.

It will be understood that the use of the present invention is not limited to rayon tire cords but the invention may be applied to rayon duck, nylon cords, nylon duck and like industrial fibrous materials.

What is claimed is:

1. A method comprising treating an organic fibrous rubber reinforcement material to improve the resistance thereof to heat, water and fatigue, while improving the flexibility, strength and adherence to rubber by forming a dilute treating solution consisting essentially of an organic tin compound in a concentration of less than 10% by weight and applying the solution to the fibrous material.

2. A method as claimed in claim 1, wherein said treating solution contains said organic tin compound in composition with a vegetable oil and wherein the latter composition is in a solution of water.

3. A method as claimed in claim 1 wherein said treating solution contains said organic tin compound in composition with a vegetable oil and wherein the latter composition is in a solution of organic solvent.

4. The method defined in claim 1 wherein the tin compound is a dialkyl tin compound.

5. The method defined in claim 1 wherein the tin compound is selected from the group consisting of dibutyl tin distearate, dibutyl tin dilaurate, dibutyl tin dimalate and dibutyl tin polysulfide.

6. The method defined in claim 1 wherein the tin compound is a triorgano tin sulfide having the general formula

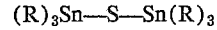

$$(R)_3Sn-S-Sn(R)_3$$

wherein R stands for $-C_nH_{2n+1}H$, $n$ being a positive integer.

7. The method defined in claim 1 wherein the solvent of the tin compound is water.

8. The method defined in claim 1 wherein the solvent of the tin compound is an organic solvent.

9. A method of improving the strength of a rubber article and the adhesion between the rubber of the article and organic reinforcing fibrous material therefor, said method comprising: treating the fibrous material by applying thereto a dilute treating solution consisting essentially of an organic tin compound in a concentration of less than 10% by weight, and joining the thusly treated fibrous material to the rubber.

10. A method as claimed in claim 9 comprising forming an adhesive composition for applying to the fibrous material and applying said treating solution to the fibrous material by adding the treating solution to the adhesive composition and immersing the fibrous material in the thusly formed solution.

11. A method as claimed in claim 9 comprising first applying the treating solution to the fibrous material, thereafter drying the same and then effecting adhesive treatment of the thusly dried and treated fibrous material.

12. A method as claimed in claim 9 wherein said treating solution contains said organic tin compound in composition with a vegetable oil and wherein the latter composition is in a solution of water.

13. A method as claimed in claim 12 when the proportion of organic tin compound is less than 50% by weight of the vegetable oil.

14. A method as claimed in claim 9 wherein said treating solution contains said organic tin compound in composition with a vegetable oil and wherein the latter composition is in a solution of organic solvent.

References Cited in the file of this patent

UNITED STATES PATENTS

| | | |
|---|---|---|
| 2,431,078 | Powell et al. | Nov. 18, 1947 |
| 2,567,331 | Gaiser et al. | Sept. 11, 1951 |
| 2,653,112 | Roseveare | Sept. 22, 1953 |

FOREIGN PATENTS

| | | |
|---|---|---|
| 792,308 | Great Britain | Sept. 16, 1955 |